Sept. 4, 1923.
E. L. KELLOGG
1,467,001
METHOD OF ANCHORING MICROPHONE PARTS
Filed June 3, 1922
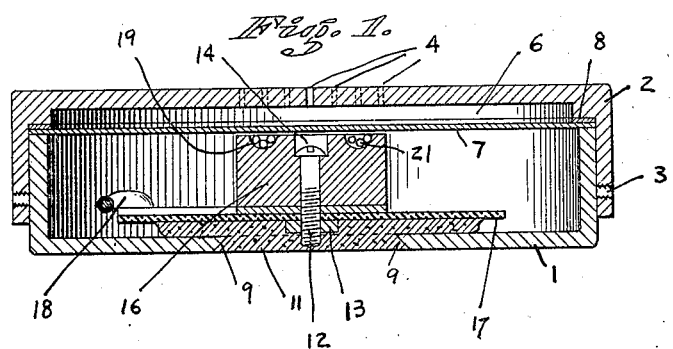
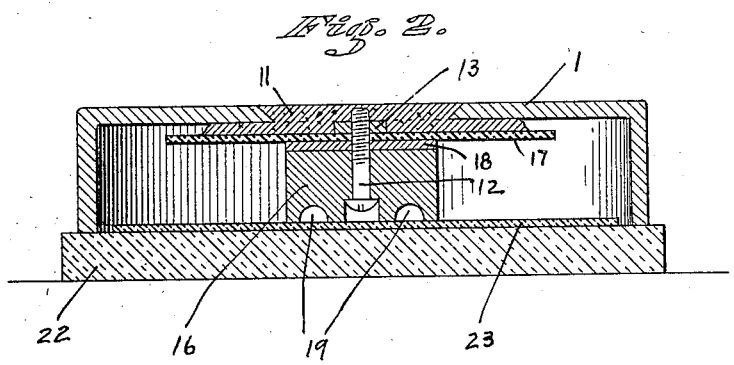
Inventor
ELMO L. KELLOGG
By Bradley L. Benson
Attorney.

Patented Sept. 4, 1923.

1,467,001

UNITED STATES PATENT OFFICE.

ELMO L. KELLOGG, OF SAN FRANCISCO, CALIFORNIA.

METHOD OF ANCHORING MICROPHONE PARTS.

Application filed June 3, 1922. Serial No. 565,587.

*To all whom it may concern:*

Be it known that ELMO L. KELLOGG, a citizen of the United States of America, residing at 587 Turk Street, San Francisco, in the county of San Francisco and State of California, has invented certain new and useful Improvements in Methods of Anchoring Microphone Parts, of which the following is a specification.

The present invention is a method of anchoring microphone parts in relation to an anchorage means for securing the parts of microphones, telephonic instruments and the like, requiring delicate adjustment and accuracy of position.

The objects of the invention include;

(1) A method of assembling knock-down parts of instruments of the character described, which will afford a very accurate adjustment of the parts to facilitate the function thereof and to retain carbon globules of various diameters which are commonly used in such instruments;

(2) To employ a plastic material as a bond for the relative parts when they have been adjusted in proper relation, and which will preserve said adjustment when once made against accidental displacement in careless handling;

(3) The provision of a method by which knock-down parts of said instruments may be readily assembled by inexperienced persons, and which will assure proper spacing and rigidity of the parts.

It is now a common practice to use a variety of washers or shims which are held by screws, to properly space the carbon block from the diaphragm of an instrument, and as different diameters of globule carbon are employed it is necessary to adjust the various screws to a nicety in order to ensure results in operation. This adjustment is very delicate and requires time of an expert operator, and is easily disarranged.

The present method contemplates a means of assembly whereby a pre-determined spacing of the parts is effected by sheets of mica used to separate the parts as they are assembled, and the parts when assembled are clamped together and a plastic material is employed as a bond which, when set, holds the parts permanently in the desired position.

In this specification and the annexed drawings, the invention is illustrated in the form considered to be the best, but it is to be understood that the invention is not limited to such form because it may be embodied in other forms, and it is also to be understood that in and by the claims following the description it is desired to cover the invention in whatever form it may be embodied.

In the accompanying one sheet of drawing, Fig. 1 is a central cross-section of a typical microphone instrument, showing my anchorage means employed therein.

Fig. 2 is a diagrammatic view illustrating the lower member of Fig. 1 in inverted position and resting on a piece of glass to show the method of assembly.

Referring to the drawings, Fig. 1, the numeral 1 indicates a cylindrical back or base member of a microphone, and 2 is the base plate or cover of said instrument. These parts are adapted to be held together as shown in Fig. 1 by set screws (not shown) threaded in apertures 3 of the cover 2. The cover 2 is provided with the usual apertures 4, to admit sound to an air chamber 6 between said cover and a diaphragm 7. Introduced between the diaphragm 7 and a shoulder on the cover 2 is an insulation ring 8. The base plate 1 is provided with a countersunk aperture 9 for the purpose of anchoring plastic material 11 introduced as will be later described to secure terminals to the base plate 1.

Embedded in the plastic material 11 is one end of a threaded screw 12 with a nut 13 thereon. The head of the screw 12 is in a bore 14 of a carbon post 16. Between the carbon post 16 and a mica disc 17 are secured electrodes 18, only one of which is here shown. The carbon post 16 is provided with spherical depressions 19, in which are globular carbon particles 21.

The parts so far described, with the exception of the plastic material 11, are typical in various telephonic and microphone instruments, and no claim is made thereto in this application which relates to the method of assembling and anchoring said parts.

It is essential to the operation of these devices that a small space be left between the upper surface of the carbon post 16 and the under surface of the diaphragm 7. The space so left will be determined by the size of the globular carbon particles employed. It is obvious that where very small globules are used, a very small space will be required to prevent the carbon particles from displacement.

In Fig. 2 I illustrate the method by which I effect this adjustment and anchor the parts assembled.

At 22 I show a plate of glass or any suitable flat surface, upon which I place a shim of mica 23. This shim 23 is of a diameter small enough to permit the entrance thereof to the base 1.

I now assemble the carbon post 16, screw 12, electrode 18 and mica disc 17 and put on the threaded nut 13. These parts are inverted and rested on the shim 23. The base plate 1 is next inverted and rested on the glass plate 22 as shown in Fig. 2. I next introduce through the aperture 9 the plastic material 11. I find that plaster of Paris is well suited to this use, and while in a plastic state it is forced in an annular ring between the disc 17 and the inner adjacent wall of the base plate 1. The plastic material is filled around the nut 13 and the projecting portion of the screw 12, and allowed to entirely fill the counter-sunk aperture 9, and allowed to set. After the setting it is surfaced to correspond with the outer wall of the base plate 1.

It will be seen by this method that any pre-determined distance which it is desired to effect between the carbon post 16 and the diaphragm 7 may be repeatedly secured by employing in each instance the same thickness of shim 23. It will be understood that the parts are held clamped together by any suitable means while the plastic material is setting.

I claim:—

1. In an instrument in which a diaphragm is positioned on the edge of a cup-shaped base member, the method of securing an accurate spacing of said diaphragm from other co-acting parts, which consists in assembling said parts upon a shim smaller than the inner diameter of said base, and of a thickness commensurate with said spacing, covering said parts with an inert disc, securing said parts and disc together, inverting said base thereupon and pouring a plastic material upon said disc and between it and said base, thus fastening said base and parts together, then removing said shim and applying said diaphragm.

2. The method of gauging the space between a diaphragm and other co-acting operative parts adapted to be enclosed in a casing, which consists in assembling said parts upon a flat surface, with a shim occupying said space, perforating the casing with a dovetail orifice, placing the casing over the parts in its ultimate position, pouring a plastic material, capable of hardening, through said orifice, and when set, removing the shim.

In testimony whereof I affix my signature.

ELMO L. KELLOGG.